(12) United States Patent
Gurevich et al.

(10) Patent No.: US 6,899,511 B2
(45) Date of Patent: May 31, 2005

(54) MODULAR ROBOTIC DEVICE AND MANUFACTURING SYSTEM

(75) Inventors: Leon Gurevich, St. Louis, MO (US); Emanuil Grigg, St. Louis, MO (US)

(73) Assignee: Rapid Development Services, Inc, Mo. Corp, Chesterfield, MO (US)

( * ) Notice: Subject to any disclaimer, the term of this patent is extended or adjusted under 35 U.S.C. 154(b) by 61 days.

(21) Appl. No.: 09/981,247

(22) Filed: Oct. 16, 2001

(65) Prior Publication Data

US 2002/0064447 A1 May 30, 2002

Related U.S. Application Data

(60) Provisional application No. 60/241,435, filed on Oct. 19, 2000.

(51) Int. Cl.[7] .................................................. B25J 5/02
(52) U.S. Cl. ................................. 414/749.1; 198/468.9
(58) Field of Search ........................... 414/749.1, 749.4, 414/751.1, 416.04, 416.09, 331.1, 331.18, 222.07, 222.12; 198/861.1, 431, 347.1, 468.9, 803.14, 803.15; 901/16

(56) References Cited

U.S. PATENT DOCUMENTS

| | | | |
|---|---|---|---|
| 4,005,782 A | * | 2/1977 | Crockett .................... 901/16 X |
| 4,595,335 A | * | 6/1986 | Takahashi et al. ........ 901/16 X |
| 4,783,904 A | | 11/1988 | Kimura |
| 4,902,258 A | | 2/1990 | Dunsmore et al. |
| 4,911,598 A | | 3/1990 | Sarvary et al. |
| 4,990,839 A | | 2/1991 | Schonlau |
| 5,078,570 A | * | 1/1992 | Loock ..................... 414/751.1 |
| 5,084,951 A | | 2/1992 | Bonomi et al. |
| 5,445,045 A | * | 8/1995 | Nagai et al. .............. 901/16 X |
| 5,560,281 A | * | 10/1996 | Schneid .................... 901/16 X |
| 5,586,387 A | | 12/1996 | Nakatani et al. |
| 5,720,202 A | | 2/1998 | Senjo et al. |
| 5,755,515 A | | 5/1998 | Senjo et al. |
| 5,831,360 A | | 11/1998 | Senjo et al. |
| 6,041,500 A | | 3/2000 | Terpstra |

OTHER PUBLICATIONS

"BOSCH Flexible Automation" catalogue.
"RC Robo Cylinder" product pamphlet.

* cited by examiner

*Primary Examiner*—Donald W. Underwood
(74) *Attorney, Agent, or Firm*—Paul M Denk

(57) ABSTRACT

A manufacturing system is provided for automatic assembly, testing and/or packaging of a variety of products. The system is based on utilization of one or more robotic modules, each having a programmable servo-driven linear actuator of a rod type, combined with slides, and standardized extrusions that form guide rails and a frame to support the actuators. The standardized extrusions include a plurality of faces, with a groove formed in at least one of the faces. Each slide fits in one of the grooves and is attached to the actuator rod, which moves the slide along the guide rails. The guide rails provide structural support to the slides in every direction that a load is attached to the slides, and include grooves to direct the motion of the slides. Two or more such robotic modules, each being positioned in a Cartesian coordinate relationship to one another, complete a system. Each module houses a dedicated controller that operates its respective actuator. The dedicated controller, in turn, connects to a remote computer or industrial controller such that a programmed sequence for robotic motion can be provided by the computer to control movement in the system in all three Cartesian directions.

13 Claims, 15 Drawing Sheets

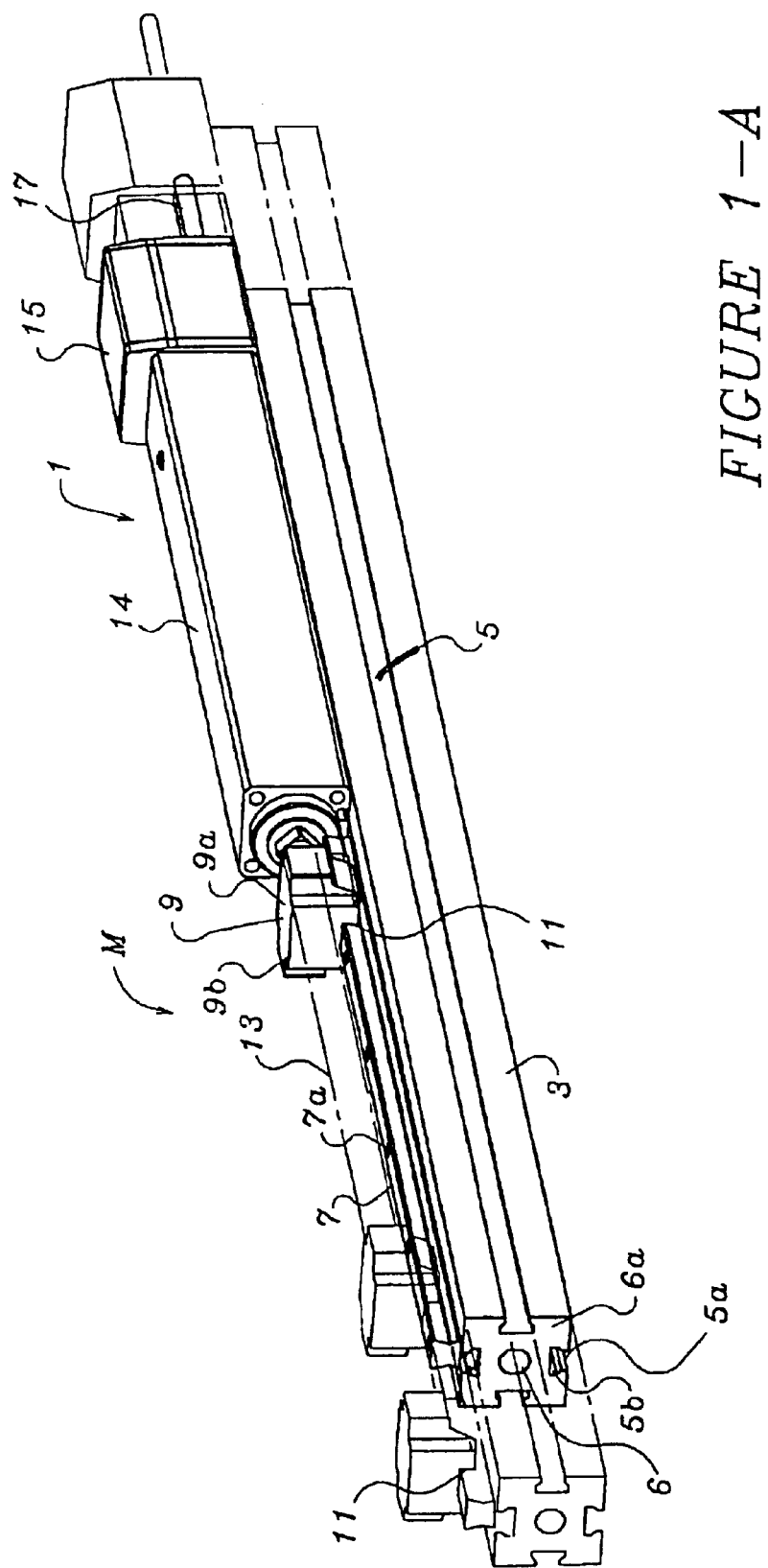
FIGURE 1-A

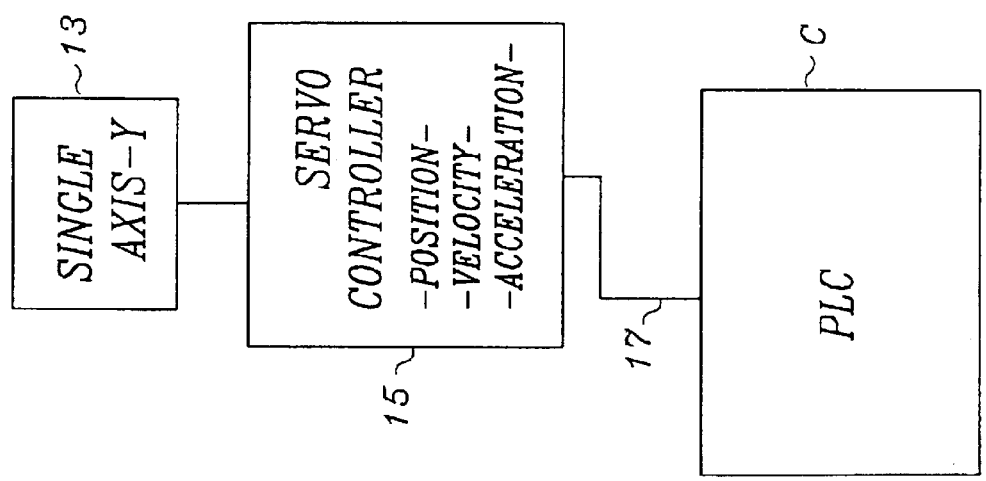

MODULAR ROBOTIC DEVICE AND MANUFACTURING SYSTEM

CROSS-REFERENCE TO RELATED APPLICATIONS

This application claims priority to provisional application Ser. No. 60/241,435 filed Oct. 19, 2000, entitled "Modular Robotic Device And Manufacturing System", and which is incorporated herein by reference.

STATEMENT REGARDING FEDERALLY SPONSORED RESEARCH OR DEVELOPMENT

Not Applicable.

BACKGROUND OF THE INVENTION

This invention relates to automatic manufacturing equipment used for assembly and/or processing of products. More particularly, it relates to a high rate, flexible, automatic production system employing one or more robotic modules, each having a programmable servo-driven actuator, where each actuator is combined with slides mounted in guide rails that are part of an extruded structural frame to provide single direction linear robotic motion.

Current automated assembly or processing equipment for special products is typically custom tailored to one or more specific products, and designed to provide positioning or placement for end effectors or tools. Such automatic machines or systems consist of product feeding equipment (feeders, conveyors, magazines, trays etc.) and transfer equipment to move and position product from station to station. Several well-known transfer systems have been employed in automatic assembly. Transfer system types include rotary dial, indexing conveyor, indexing chain, belt, walking beam or palletizing conveyor, that work in combination with stop and lift/register devices.

A typical automatic assembly system may also employ so-called "positioning" or "placement" devices that utilize many different types of actuators. An actuator is a displacement device that activates, or repositions by force, a movable member of the machine, and may, for example, be pneumatic cylinders (compressed air operated), hydraulic cylinders (compressed fluid operated), or electrical motors in combination with belts, chains, gears or feed screws. The positioning device actuators are generally used to provide a so-called "pick and place" motion to the movable member. They can be used to retrieve a product from a feeding device and place the product onto a transfer device.

Sometimes the pick and place devices rely on the use of a cam-driven actuator to provide controlled acceleration/de-acceleration and achieve high speed for product placement. Such devices have a number of limitations and drawbacks. A rotating cam action typically is limited to a single position for points of pick-up and placement. Yet, more significantly, because its shape defines all motion parameters and cannot be changed quickly, a cam is limited to a single movement pattern. Thus, while a cam actuation device can provide fast product transfers, it cannot be used for more than a single point-to-point transfer without substantial modification.

Pneumatic cylinders are low cost and widely used in automated assembly machinery. However, this type of device generally doesn't have programmable position control or programmable acceleration and velocity. Thus utilization of pneumatic cylinders is limited to simple pick and place movements using mechanical stops for registration. The individual cylinders cannot be reprogrammed. Hence, these devices cannot be automatically changed for different positions. In addition, pneumatic cylinders exhibit high failure rates due to wear and require extensive maintenance, including repeated mechanical adjustments to control accurate position.

Pneumatic cylinders also suffer from an inability to maintain constant acceleration and velocity. This is due to the large number of variables that impact the function of the cylinders, such as: friction (lubrication), temperature fluctuation, air pressure fluctuation, air flow fluctuation, air leakage, moisture content in the air lines, wear of seals, bushings, and bearings, and contaminants inside the cylinder. Thus, application of this device is limited to pick and place or simple positioning of a tool when both pick up and destination points are fixed.

A servo-controlled robotic device is generally more expensive and frequently custom designed to include a complete device that is built with its own support and mechanical guiding means and a programmable controller for a single or several devices. Several standard linear robotic devices, manufactured by robotic companies are available as self-enclosed and fully integrated linear robotic modules. They can be mounted together to construct one-, two- or three-axis robots typically controlled by a single controller. Frequently such devices have performance that allows completion of motion with programmable control for acceleration/deceleration, velocity and position. However, the cost of these devices is high and often precludes their use due to high level of investment. It is known that high cost of investment in equipment frequently cannot be justified based on the benefit it produces.

For many products the manufacturing and assembly processes consist of many different steps, involving a large number of specialty parts. This makes standardization of the manufacturing robotics difficult. Many attempts have been made to create a standardized, programmable robotic device or system, that can provide a more cost effective and flexible approach to this dilemma. Such a system must be capable of being used for more then one application, with enough flexibility to manufacture more then one product.

The robotic devices are readily available to allow creation of such systems, but at a relatively high cost. The costs of such systems, in fact, are often so high as to outweigh the potential benefits of implementing dedicated automatic manufacturing systems.

The ability to create a low-cost programmable, servo-driven, multi-axis robot and construct modular automatic systems based on such robots is extremely important to the manufacture and assembly industry, and can provide substantial economic benefit.

BRIEF SUMMARY OF THE INVENTION

In accordance with the teaching in this invention, the automatic system employing robotic linear devices is described for assembling and/or processing product or part. More particularly, the system is a high rate, flexible, automatic production system employing one or more robotic modules, each having a programmable servo-driven actuator, where each actuator is combined with slides mounted in guide rails that are part of an extruded structural frame to provide single direction linear robotic motion. Unlike expensive machined parts in conventional robotic devices, the guide rails and frame are formed from inexpensive, standardized and pre-formed extrusions, of low cost materials such as aluminum. These components can be quickly cut to a wide range of lengths, and readily assembled with low cost fasteners to provide great versatility in the dimensions of each module. The modules can be mounted in a Cartesian multi-axis relationship to provide linear positioning in three-dimensional space.

Hence, this invention describes a novel, cost effective and versatile robotic device that can be programmed or controlled directly to effect automated movements in one-, two- or three-dimensional Cartesian space. Furthermore, the invention is not limited to applications as a stand-alone device, but may be configured in combination with selected automation components to create a unique, cost effective and highly flexible manufacturing system.

The modular robotic system of the invention provide a high rate for automatic assembly system, yet employ a relatively slow moving mechanism to achieve very high throughput for assembly or processing. Conventional systems used for high speed assembly (i.e., 50 to 500 parts per minute) rely on high speed or high rate of acceleration/ deceleration for indexing or transfer of a single part from one working station to another. The proposed system is based on a single index per batch. Batch size can be 4 to 400 parts. For example, for a 60 parts per minute rate system, indexing one part every cycle on conventional high speed system with 0.5 seconds index time, will take 0.5×60 parts or 30 seconds of unused time (50%) for transfers. The proposed system with a batch size of 60 parts will be indexed in 3 seconds.

A proposed system comprises standard robotic devices, has a measurable and predictable mean time to failure based on actual tests, and can be presented in hours of product life before potential failure. For example, factory published data for servo actuators used by the invention, traveling at 12" per cycle at 10 cycles per minute, gives a 3 meters per minute rate of travel. A published life span for one-kilogram load is 4,000 KM, resulting in 4,000,000 meters divided by 3 meters which corresponds to 133 million minutes or 21,666 hours. The system operating 2 shifts at 16 hours per day will have 1,354 days or 5.4 years (250 days per year) before failure. This predictable reliability provides calculated uptime for equipment and gives predictable payback on investment. Unlike conventional custom equipment with unpredictable behavior and unknown reliability a proposed system has standardized robotic devices and standardized transfer and controls.

As noted, the system is made from one or more modular units each of which perform a specific function. Each modular unit includes a frame made from an extruded structural member. At least one servo-controlled linear actuator is mounted in the unit. The actuator includes a body, a rod which is extendible and retractable relative to the actuator body, and a dedicated controller which moves the rod. A control system, such as computer, is in communication with the actuator controller, and, sends signals to the actuator controller to extend and retract the actuator rod according to a desired pattern or program. A slide rail is mounted to a structural member of the unit and a slide is slidable along said slide rail. The actuator rod is operatively connected to the slide to move said slide along said slide rail in response to signals from the control system. A machine part is connected to the slide to perform an operation on the parts. The machine part, for example, can be a rake which accepts parts from a feeder system; a tray which moves a quantity of parts from one location to another, or a gripper which moves product or parts from the rake to the tray. Other types of machine parts could be provided to perform other functions to the parts.

The unit can include a single actuator, to move the machine part along a single axis. Alternatively, the unit can include two or three actuators to move the machine part in two or three axis. In a "two-axis" unit, a first actuator and a second actuator are mounted in the modular unit. The rod of the first actuator moves in a first axis and the rod of the second actuator moving in a second axis. The second actuator is operatively connected to the first actuator rod to be moved in the first axis by the first actuator. The machine part, then, is operatively connected to the second actuator rod to be moved in the second axis by the second actuator. Hence, controlled movement of the first and second actuator rods by the control system moves the machine part in two axes.

In a "three-axis" system, the modular unit includes a first actuator, a second actuator, and a third actuator mounted in the modular unit. The rod of the first actuator moves in a first axis, the rod of the second actuator moves in a second axis offset from the first axis, and the rod of third actuator moving in a third axis offset from both the first and second axes. In effect, the first and second axes define a plane, and the third axis is offset from (or intersects) the plane defined by the first and second axes. The second actuator is operatively connected to the first actuator rod to be moved along the first axis; the third actuator is operatively connected to the second actuator rod to be moved along the second axis; and the machine part is operatively connected to the third actuator rod to be moved along the third axis. Hence, controlled movement of the first, second, and third actuator rods by the control system moves the machine part in three axes.

The structural members used to construct the modular units allow the units to be modular in form; to be easily connected to each other; and to thus easily construct a complete processing line to process a particular product. The structural member is cut from an extruded member and includes a plurality of side faces and a pair of end surfaces. The extruded member can be triangular, quadrilateral, hexagonal, or have any other regular or irregular polygonal shape in cross-section. A groove is form in at least one of the faces (and preferably all of the faces) and a hole is formed in at least one of the end surfaces of the extruded member. The groove is generally T-shaped and had a base portion and a narrower neck portion extending from the base portion to the face of the extruded member. A headed part is receivable in the groove to connect a plurality of structural members together, to mount the slide rail to the structural member, or to mount the machine part to the structural member. The headed part can be a button or a threaded fastener (i.e., a screw or bolt). Another headed part is received in (or extends from) the hole at the end surface to allow for two structural members to be connected together in a T-shaped form.

Additionally, the slide and the linear actuator are mounted to the extruded member using headed parts (i.e., buttons, bolts, screws, etc.).

BRIEF DESCRIPTION OF THE SEVERAL VIEWS OF THE DRAWINGS

In the accompanying drawings, which form part of the specification and wherein like numerals and letters refer to the like parts wherever, they occur:

FIG. 1A is a perspective view of a single-axis robotic module formed in accordance with the present invention;

FIG. 14 is a schematic of a single-direction robotic module connected to a remote computer.

Corresponding reference numerals will be used throughout the several figures of the drawings.

DETAILED DESCRIPTION OF THE INVENTION

Figure 1:
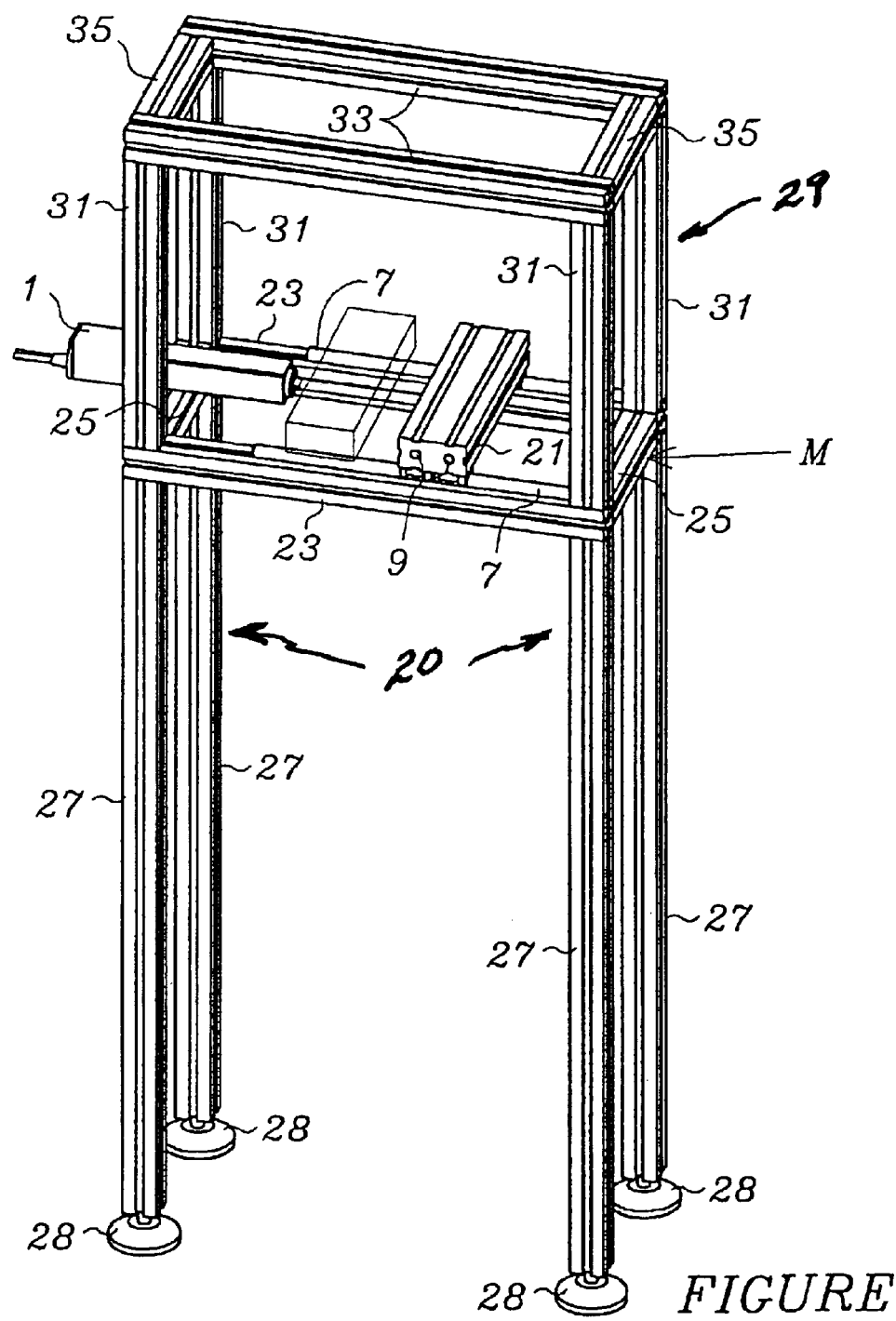
FIG. 1 is a perspective view of another single axis robotic modular unit.
Figure 2:
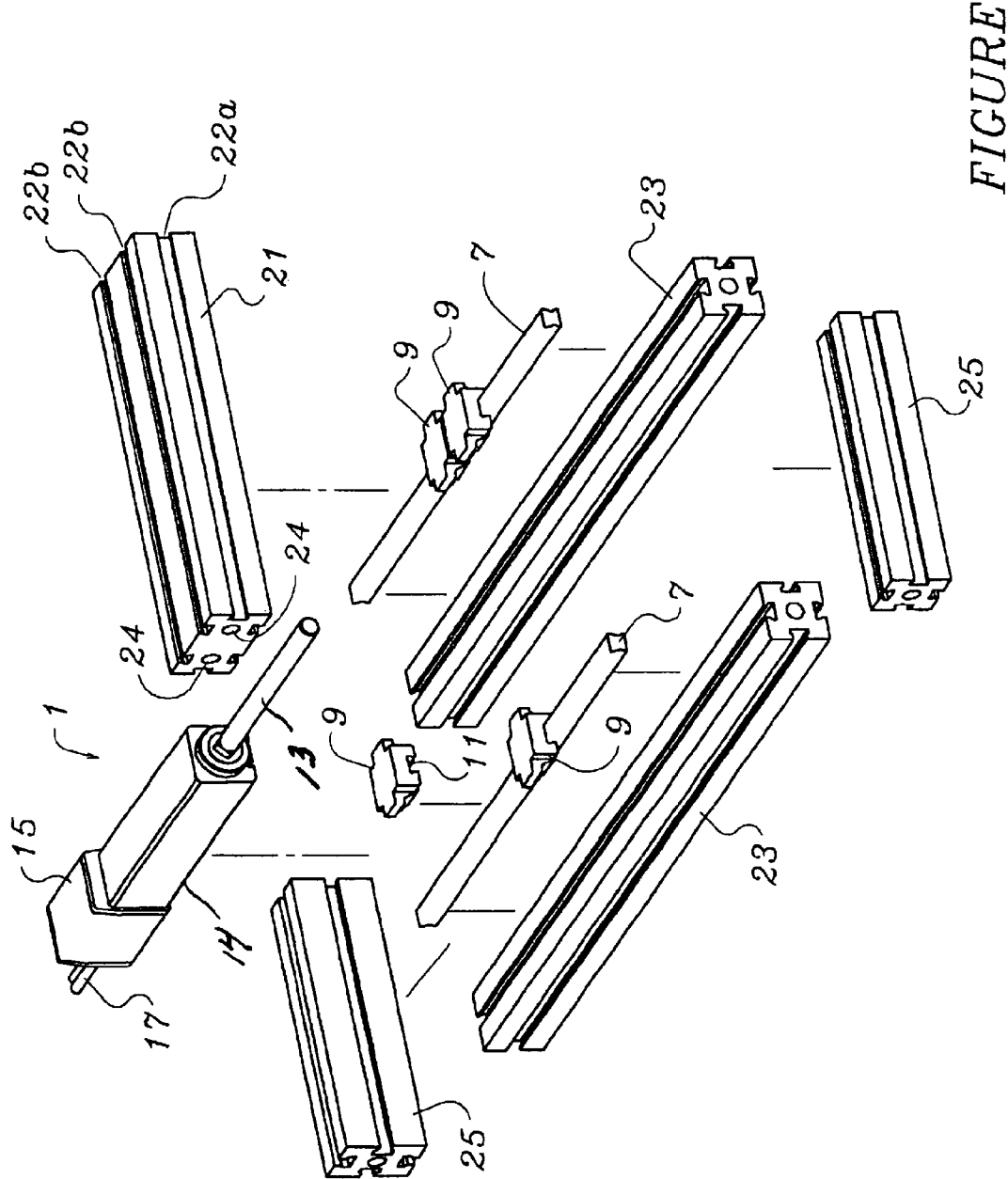
FIG. 2 is an exploded view of the assembly of FIG. 1.
Figure 3:
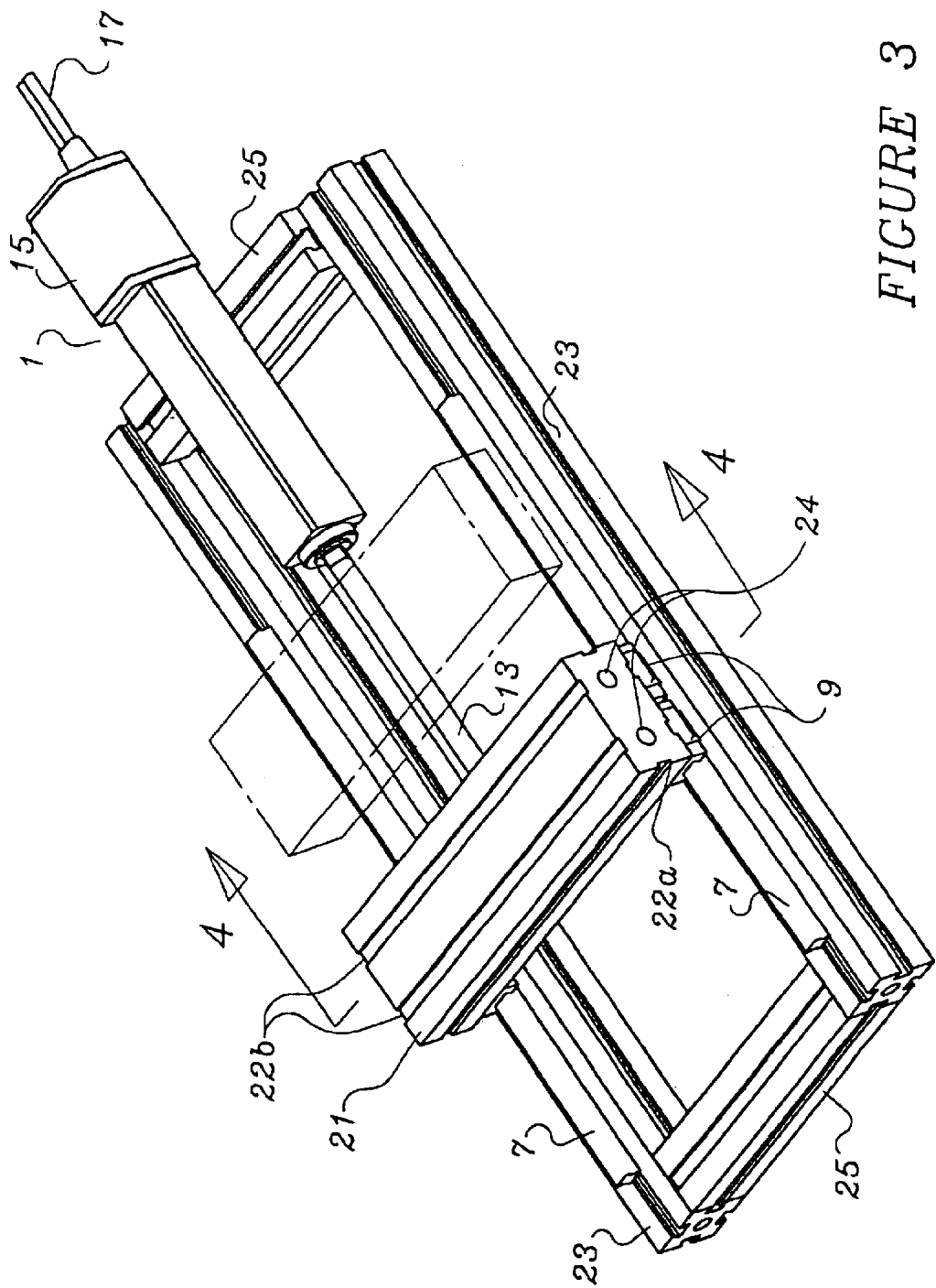
FIG. 3 is a perspective view of the module of FIG. 1.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

As will be described below, the invention resides in robotic modules which can be assembled together using frame members in various desired configurations depending on the desired operation to be carried out by an assembly.

A single robotic module M is shown in FIG. 1A. The robotic module M includes a programmable servo-driven linear actuator 1 of a rod type mounted to a frame member 3. The frame member 3 is an extruded member that is generally square in cross-section. However, the extruded frame member could be any regular or irregular polygonal shape in cross-section. A groove 5 extending longitudinally along at least one face (and preferable along all the faces) of the member 3. The groove 5 is generally T-shaped, having a neck section 5a and a wider inner section 5b. A hole 6 opens at each end surface 6a of the extruded frame member 3. Because the frame member 3 is an extruded form, the hole 6 extends longitudinally through the center of the member 3. A slide rail 7 is mounted on the frame member 3 above the groove 5. The slide rail 7 can be shaped to conform to the shape of the groove to be slid into the groove, and to be held frictionally in place in the groove 5. Alternatively, the slide rail 7 can be mounted to the frame member 3 on the face of the member 3 and over the groove 5, as seen in FIG. 1A. In this instance, the slide rail 7 can be held in place by screws which pass through threaded holes 7a in the rail 7, and which are received in nuts (not shown) which fit within the wider section 5a of the groove 5. Hence, when the screw is received in the nut, the nut will be pulled against the neck 5a (or outer surface of the groove portion 5b) to frictionally hold the slide rail 7 in place on the frame member. The slide rail 7 is somewhat hour-glass shaped in cross-section. It has flat or level top and bottom surfaces, but its side surfaces are indented, to define a groove along the side of the rail 7 which extends the length of the rail 7. A slide 9 is mounted on the rail 7 to slide relative to the rail 7. The slide 9 has a generally flat upper surface 9a with a pair of ears 9b extending from opposite sides of the slide 9 and a lower surface having a groove 11 formed therein. The groove 11 corresponds in shape to the profile of the slide rail 7 so that the slide 9 can move longitudinally along the slide 7, yet cannot be raised off the slide rail 7.

The modular unit M includes at least one linear actuator 1. The modular unit of FIG. 1A is a single axis module, and hence includes only one actuator 1. The actuator 1 has a positioning rod 13 movable inwardly and outwardly relative to a housing 14, a dedicated controller 15, and a control cable 17. The linear actuator 1 is mounted to the extruded frame member 3 by a screw, bolt, button, or other headed member (not shown). The headed member includes a head which is received in the frame member groove 5 and a stem which extends through the groove neck 5a and into the linear actuator. The linear actuator can also have a threaded shaft extending from its housing 14 or controller 15, which can extend into the frame member groove 5. A bolt which can slide through the groove is then applied to the shaft. The cable 17 places the controller 15 in communication with a computer C (FIG. 14) or other control device which sends signals to the controller 15 to extend and retract the rod 13. The computer C controls the extension of the rod, as well as the velocity and acceleration of the rod. The rod 13 is operatively connected to the slide 9. In FIG. 1A, the rod 13 is shown connected directly to the slide 9. Hence, the computer C controls the position, and well as the velocity and acceleration of the slide 9. As can be appreciated, and as will be discussed below, the module M can be used by itself to form a single direction assembly, or two or more modules can be interconnected to form assemblies which move parts in two or three directions or axes.

Turning to FIGS. 1–4, another single-axis modular unit M is assembled in a frame 20 to move a plate 21 in one direction. In this instance, the modular unit M includes a pair of parallel side members 23 which are spaced apart by end members 25. Slide rails 7 are mounted on the side members 23; two slides 9 are placed on each slide rail 7; and the plate 21 extends across, and is mounted to, the top surface of each of the slides 9. The module M is supported above the ground by legs 27 which have feet 28 at the bottoms of the legs 27. An opened case 29 surrounds the plate 21, and includes four vertical members 31 extending up from the ends of the side members 23; a first pair of horizontal members 33 extending between the vertical members 31 above the side members 23 and; and a second pair of horizontal members 35 extending between the vertical members 31 above the end members 25.

The side members 23, end members 25, legs 27 are all formed from lengths of the extruded member 3. They are connected to each other by means of buttons, screws, bolts, or other headed members which extend from the holes 6 of the members 3 and have heads which are received in the grooves of adjacent members 3. Thus, for example, the end members 25 each have a headed member (not shown) extending from opposite ends of the frame members; and the head of the headed member is received in the groove 5 of the side members 23 to form the square shaped frame for the linear actuator of the module M. The legs 27 are similarly connected to the bottom faces of the side members 23; and the members of the open case 29 are similarly connected to each other, and to the side members 23 to form the unit 20. The extruded member 3, from which all the unit members are made from are preferably extruded from aluminum. However, they can be produced from any other desired material which can be extruded, and which will withstand the withstand the environment to which the modular assembly will be subjected. Alternatively, if standard lengths of members 3 are to be used, the members 3 can be molded.

Figure 4:
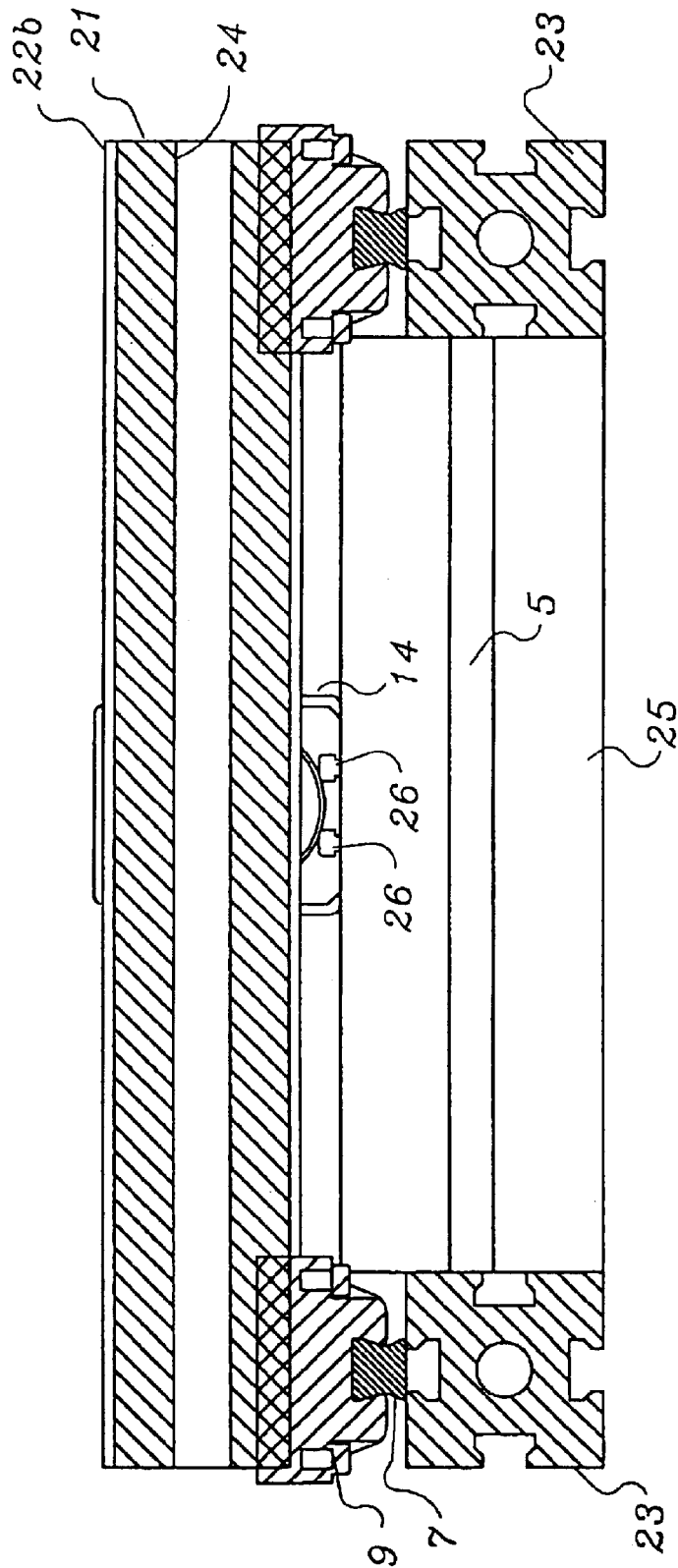
FIG. 4 is a cross-sectional view taken along line 4—4 of FIG. 3.
Figure 5:
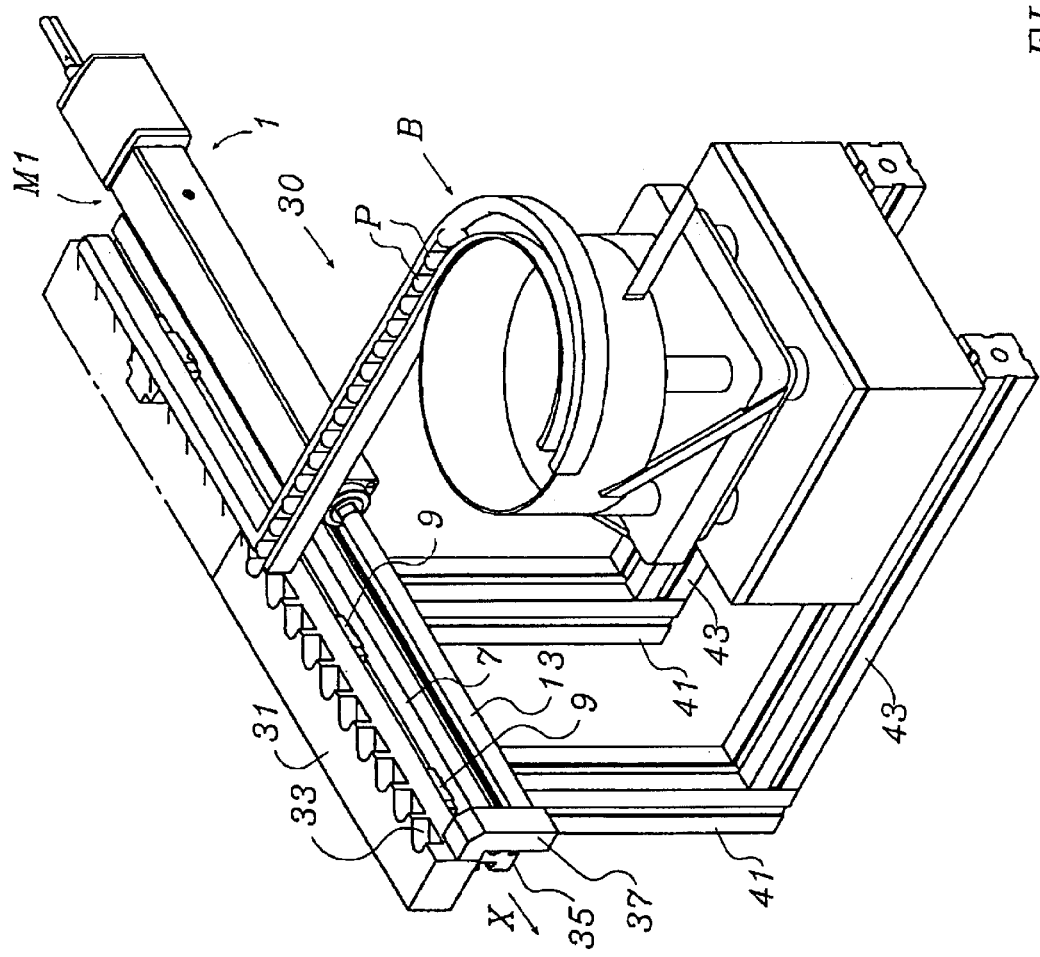
FIG. 5 is a perspective view of a single axis robotic modular unit including a bowl feeder assembly system with a movable rake for batch processing.
Figure 6:
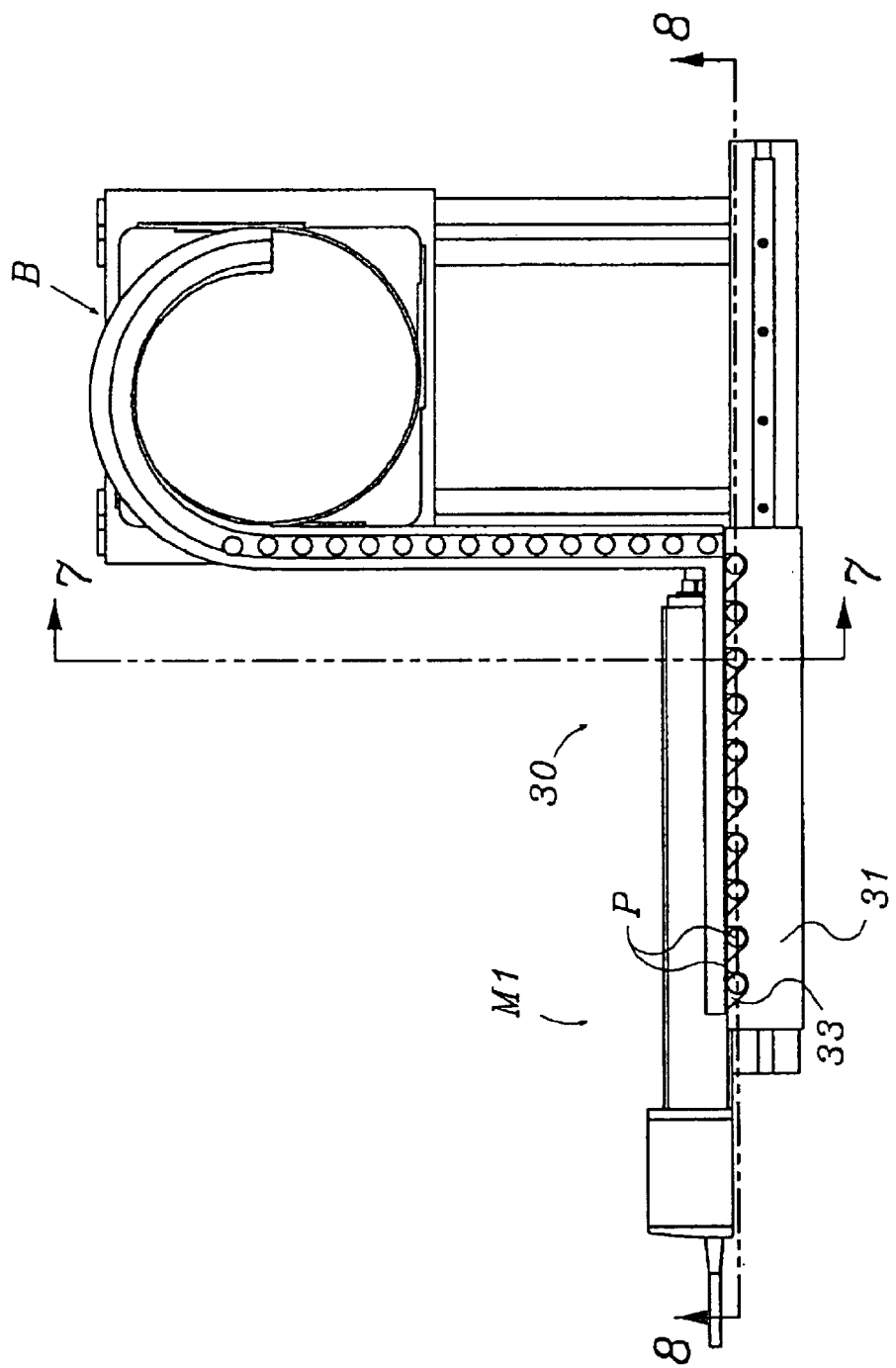
FIG. 6 is a top plan view of the bowl feeder assembly with a rake system of FIG. 5.
Figure 7:
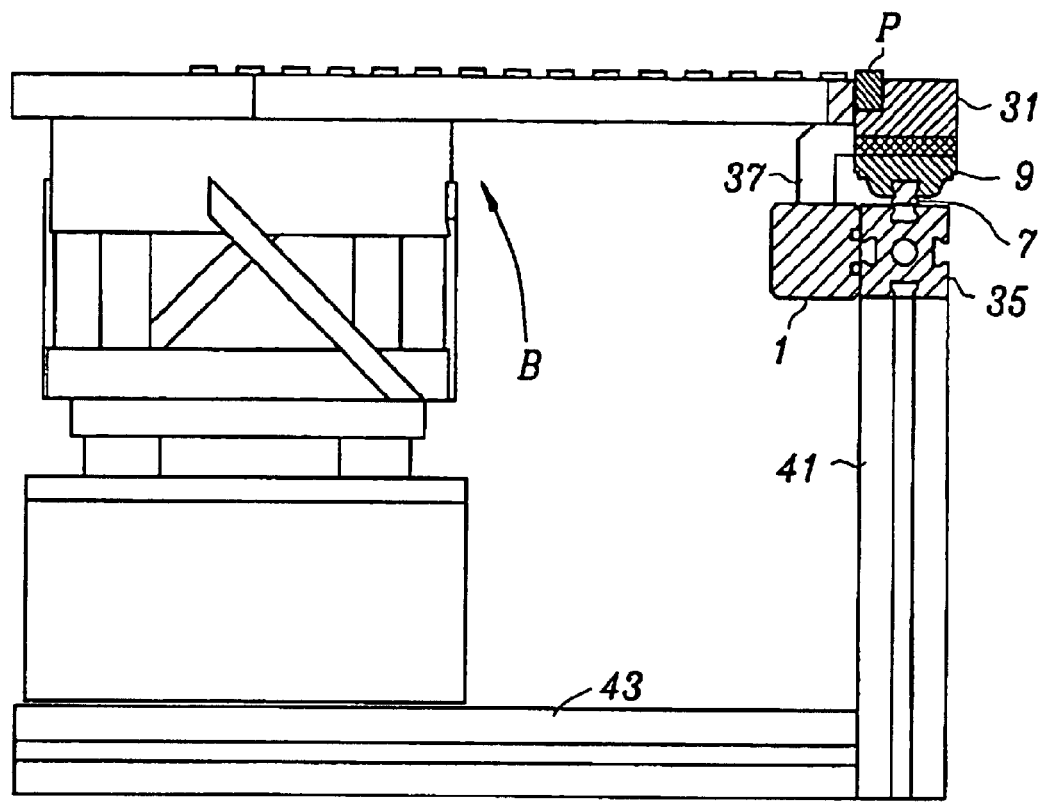
FIG. 7 is an elevational view of the bowl feeder assembly system taken along line 7—7 of FIG. 6.
Figure 7A:
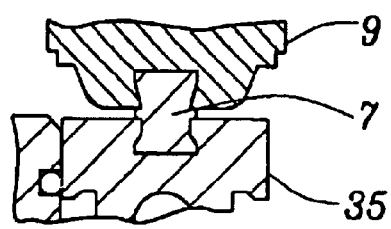
FIG. 7A is a view of a slide rail fitting into a groove frame member.
Figure 8:
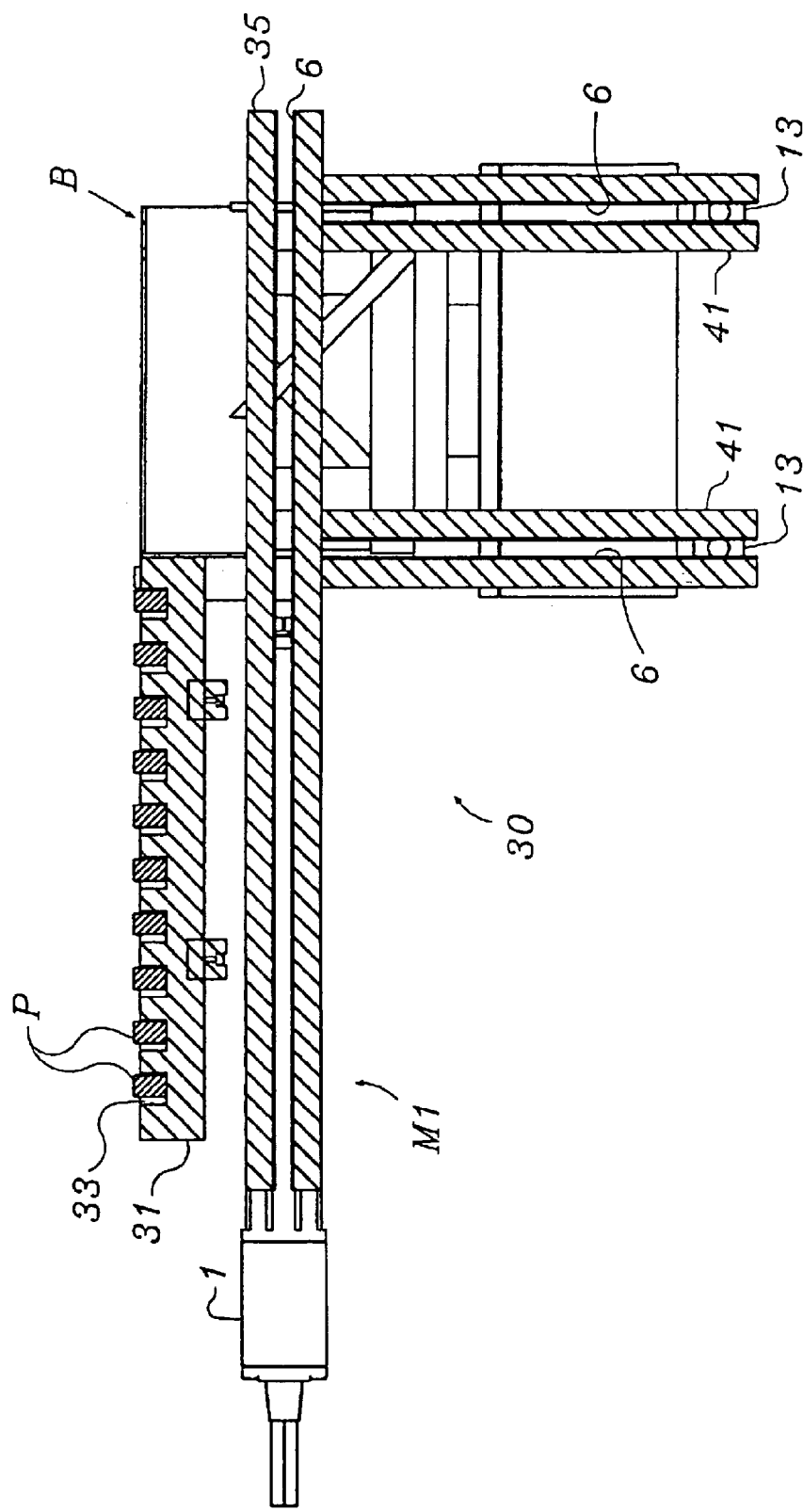
FIG. 8 is a cross-sectional view of the bowl feeder assembly system taken along line 8—8 of FIG. 6.

The actuator 1 of the module M is mounted to one of the end members 25 using screws, in the same manner that the frame members are connected together. As seen in FIG. 4, the housing 14 of the actuator 1 includes T-shaped grooves 26 which receive screws or buttons which, in turn, are received in the slots 5 of the end members 25. As can be appreciated, the module M of the unit 20 operates to move the plate 21 horizontally along the slide rails 7. The plate 21, like the member 3, is an extruded member. As seen, it essentially is two members 3 fused together. It has a groove 22a in each of the side faces and a pair of parallel grooves 22b in its upper and lower faces. Additionally, a hole 24 extends parallel to the grooves 22a,b; the holes being in line with the grooves 22b in the upper and lower faces of the plate 21. The grooves 22a,b are identical in configuration to the grooves 5 of the members 3. Hence, other frame members can be connected to the plate 21. It will be appreciated that the member from which the plate 21 is made can also be used as a frame member in a modular unit.

Turning to FIG. 14, instructions from the remote computer C are sent via the control cable 17 to the dedicated controller 15. Based upon those instructions, the dedicated controller 15 directs the actuator 1 to move the positioning rod 13 inwardly or outwardly at a specified rate for a specified period of time. This in turn causes the plate 21, in conjunction with the slides 9 to translate along the slide rails 7. In this way, the remote computer C can repeatedly direct the plate 21 to move to a desired location along the side members 23 at a desired rate of speed. The instructions for the movements of the plate 21 can be input directly into the remote computer C by an operator for instantaneous results, or the instructions can be programmed into the remote computer C by the operator to enable timed and/or complex automated sequences for the movements of the plate 21.

The single-axis module M, as exemplified in FIGS. 1–4, can be used in manufacturing and assembly applications where robotic translation is only necessary in a single Cartesian direction. An example of a single direction application is shown in FIGS. 5–8. Here, a unit 30 uses a single-axis module M1 is paired with a bowl feed device B. The module M1 moves a rake 31 having pockets 33 along a Cartesian axis X such that the bowl feed device B can precisely place parts or product P into the pockets 33 with proper orientation. The rake pockets 33 have a center to center distance corresponding to center distances for a gripper which will pick up the parts P and to center-to-center distances for a plate where the gripper will deposit the product P. The part fed by the feeder enters the rake pocket 33 due to vibration or air-flow action of the bowl feeder assembly B. The part is retained with in the rake pocket P, for example, by magnets (for magnetically activated parts—parts having iron in them) or by vacuum suction provided by channels routed through the rake member. The retaining force is designed to maintain the position of the part in the rake during rake movement as the rake is indexed through the space to receive the part P from the feeder B and to keep the parts in their proper orientation to be picked up by grippers, as discussed below.

In this configuration the proposed robotic device is used in conjunction with a specially designed feeding device consisting of a feeder such as a so-called "Vibro Bowl" or "Centrifugal Bowl." Both devices are used for handling parts, starting with bulk; they are designed to move and orient parts and to feed parts in a single file, back to back, so that parts move to a discharge point in a certain orientation. Such devices can provide a feeding rate from several units per minute to several hundreds of units per minute.

As seen, the module M1 is somewhat similar to the module shown in FIG. 1A. The module M1 uses a single frame member 35 (identical to the frame member 3). As seen more clearly in FIG. 7, the actuator 1 is mounted to one face of the member 35; a slide rail 7 with a pair of slides 9 is mounted to another face of the member 35; and the rake 31 is mounted on the slide 9. The actuator rod 13 is connected to the plate (and slides 9) by means of a connector 37. Hence, the actuator 1 is controlled by the computer C to move the rake 31 in the axis X along the rail 7 to align the rake slots 33 with the feed ramp of the bowl assembly B, so that the pellets or parts P can be placed in the rake slots 33 by the feeder to create a single batch. A single batch of parts is picked and placed by multiple grippers 114 FIG. 8 and FIG. 11. The module M1 is supported above the ground by legs 41. Horizontal members 43 extend perpendicularly from the bottom of the legs 41, and the bowl feeder assembly B is supported on the members 43. The members 43 and legs 41 are both made from cut lengths of the extruded member 3; and are connected to the legs 41 and the legs 41 are connected to the member 35 in the same manner as described above in conjunction with the module M of FIG. 1.

An object of this invention is to provide a complete robotic cell that is comprised of a stand-alone robotic device (such as a Robo-Mat® available from Rapid Development Services, Inc. of Chesterfield, Miss.), a servo actuator and a feeder. A combination of a single line feeder bowl with so-called inline feeder or gravity guide connected to a bowl and servo actuator carrying an inline rake member. The inline rake member has equally spaced cutouts to match the outer shape of the part in one of four quadrants of part outline. In other words, the shape of the part side facing the direction of discharge is duplicated in a described cut out. A servo actuator carrying the rake is programmed to stop at each position when the rake cut-out or packet is aligned with a part. The part is directed by feeder under continuous backpressure to move the part into the packet. The servo actuator advances the rake to a next position until all positions are filled with the parts in the same orientation. A center distance from part to part supported by rake is selected to be the same as the distance between pick up end effectors mounted on the robotic device.

Figure 9:
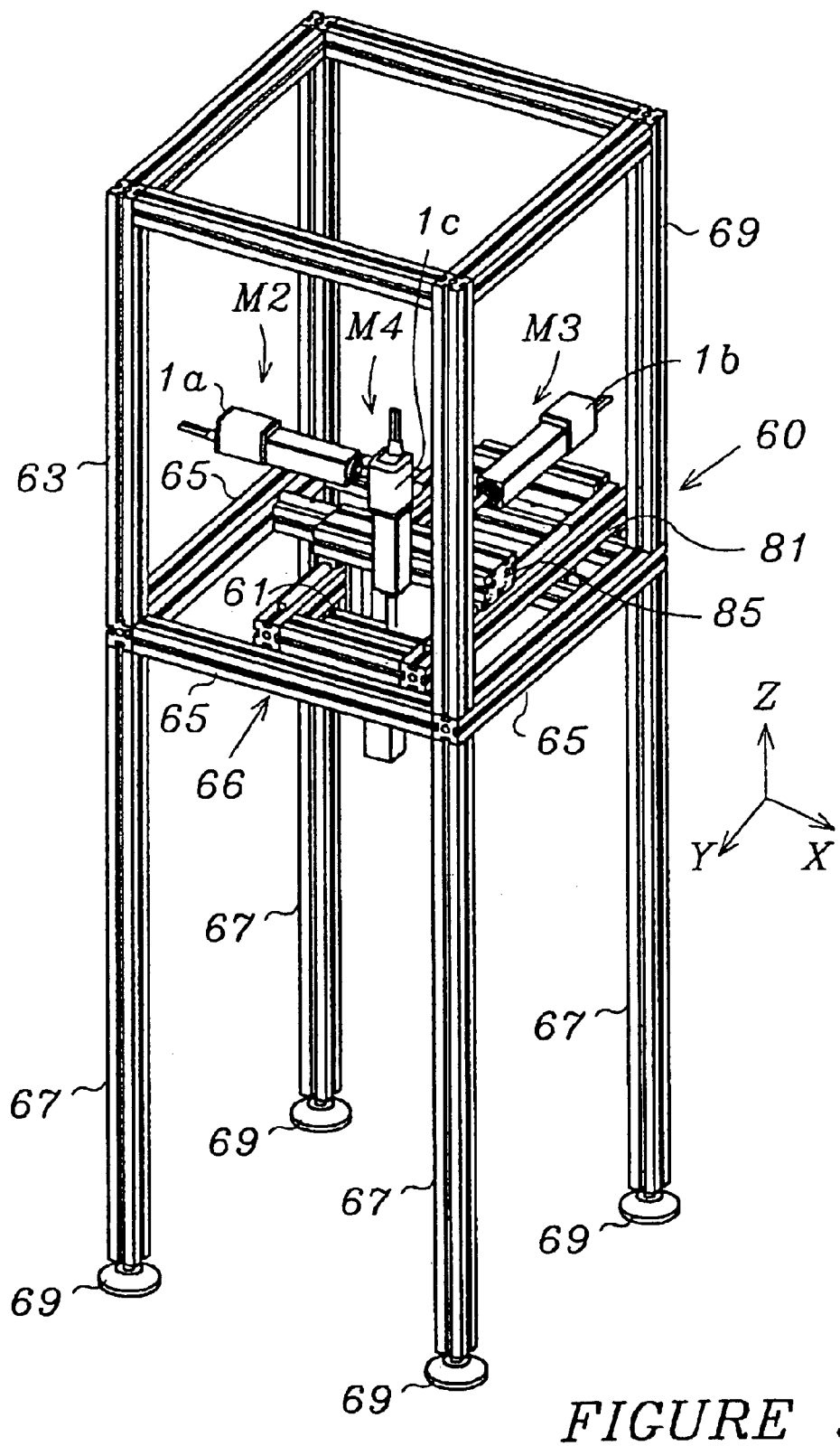
FIG. 9 is a perspective view of a three-axis robotic modular unit.

As seen in FIG. 9, a more than one robotic module can be interconnected to form a unit 60 which moves a plate 61 in three axes or directions. The unit 60 includes three modules M2, M3 and M4 which are supported in a frame 63. The frame 63 includes side and end members 65 to form a quadrilateral base 66, legs 67 having feet 69 which support the base above the ground, and an open case 69 which surrounds the three modules M2–M4. The open case 69 is constructed substantially the same way as the open case 29 which surrounds the module M of FIG. 1. The side and end members 65, the legs 67, and the members of the open case 69 are all formed from cut lengths of the extruded member 3, and are interconnected as described above.

Figure 10:
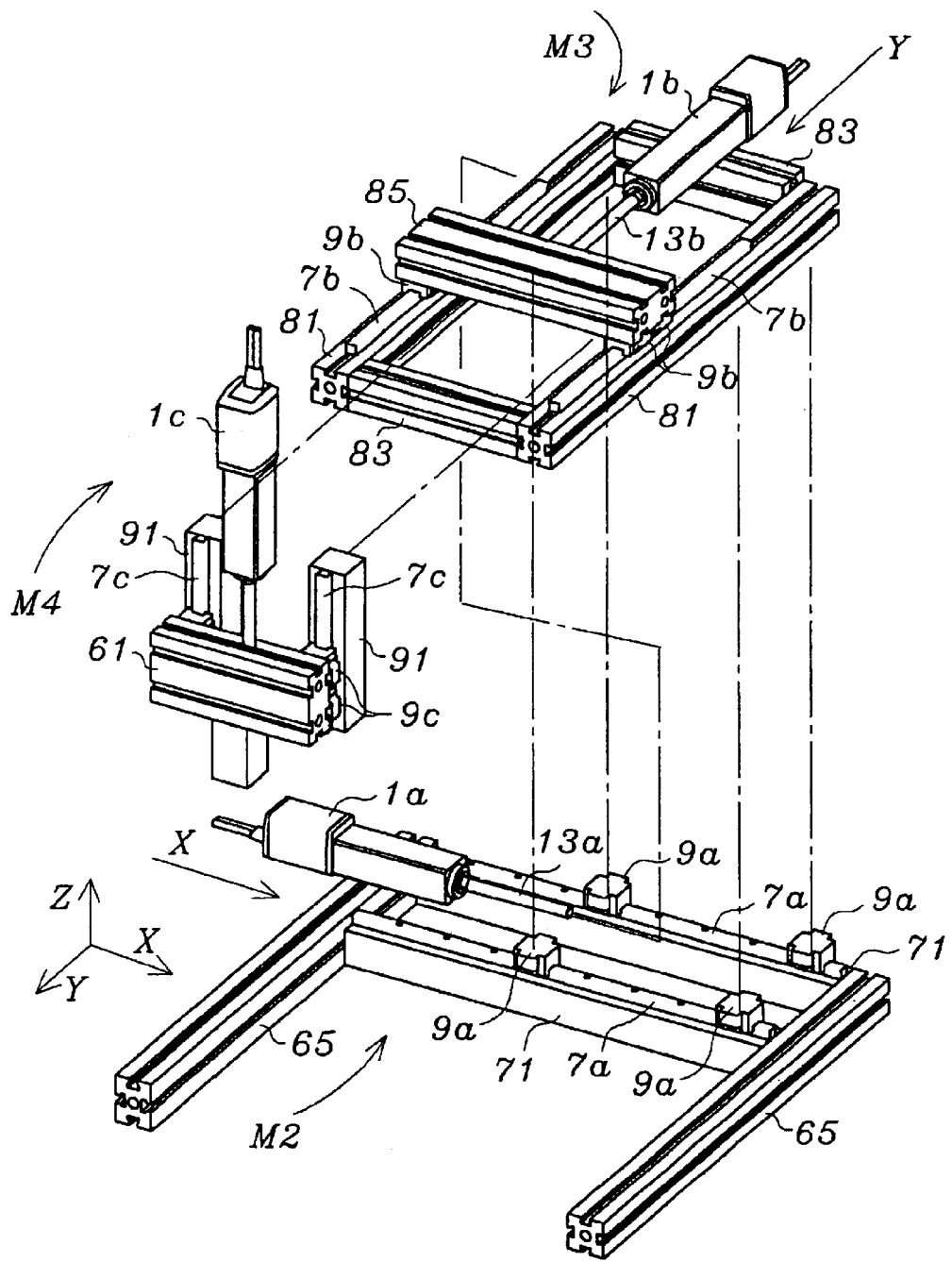
FIG. 10 is an exploded view of the assembly of FIG. 9.

The interconnection of the three modules is shown more clearly in FIG. 10. Module M2 includes a pair of parallel spaced apart side members 71 extend between two opposed side members 65 of the base 66. The members 71 are formed from cut lengths of the extrusion 3, and are connected to inner faces of the base side members 65. Slide rails 7a are mounted on the side members 71, and a pair of slides 9a is placed on each rail 7a. An actuator 1a is mounted to one of the base side members 65 between the side members 71 so that its rod 13a extends and retracts along an axis X that is parallel to the side members 71.

The module M3 includes a pair of parallel side members 81 which are spaced apart by a pair of end members 83. As seen, one of the end members is formed from a cut length of the extrusion 3, and the other end member is cut from a length of an extruded member from which the plate 31 (FIG. 1) is cut. The side members 81 are mounted to the slides 9a of module M1; and one of the slide members 81 is connected to the actuator rod 13a of module M1. Hence, Module M1 moves module M2 in the X-axis. In module M2, slide rails 7b are mounted to the side rails 81 to be in a Y-axis (and to be perpendicular to the slide rails 7a). Slides 9b are slidable along the slide rails 7b: and a cross member 85 (identical to the plate 31) extends between the side members 81 and is mounted to the slides 9b at its opposite ends. The actuator 1b is mounted to one of the end members 83 between the side members 81, such that its rod 13b extends and retracts in the Y-axis. The rod 13b is connected to the cross-member 85 to move the cross-member 85 along the members 81 in the Y-axis.

The module M4 is mounted to the cross-member 85 of module M3, hence, module M3 moves module M4 in the Y-axis. Module M4 includes a pair of parallel side members 91 extend in the Z-axis and are connected to the cross-member 85 of module M3 in a parallel, and spaced apart fashion. The actuator 1c of module M4 is also mounted to the cross-member 85 of module M3. The actuator 1c is mounted to one face of the cross-member 85, and the side members 91 are mounted to a different face of the cross-member 85. Slide rails 7c are mounted to the side rails 91 to be in the Z-axis (and to be perpendicular to the slide rails 7a and 7b). Slides 9c are slidable along the slide rails 7c: and the plate 61 (identical to the plate 31) extends between the side members 91 and is mounted to the slides 9c at its opposite ends. The rod 13c is connected to the plate 61 to move the plate along the members 91 in the Z-axis.

Figure 13:
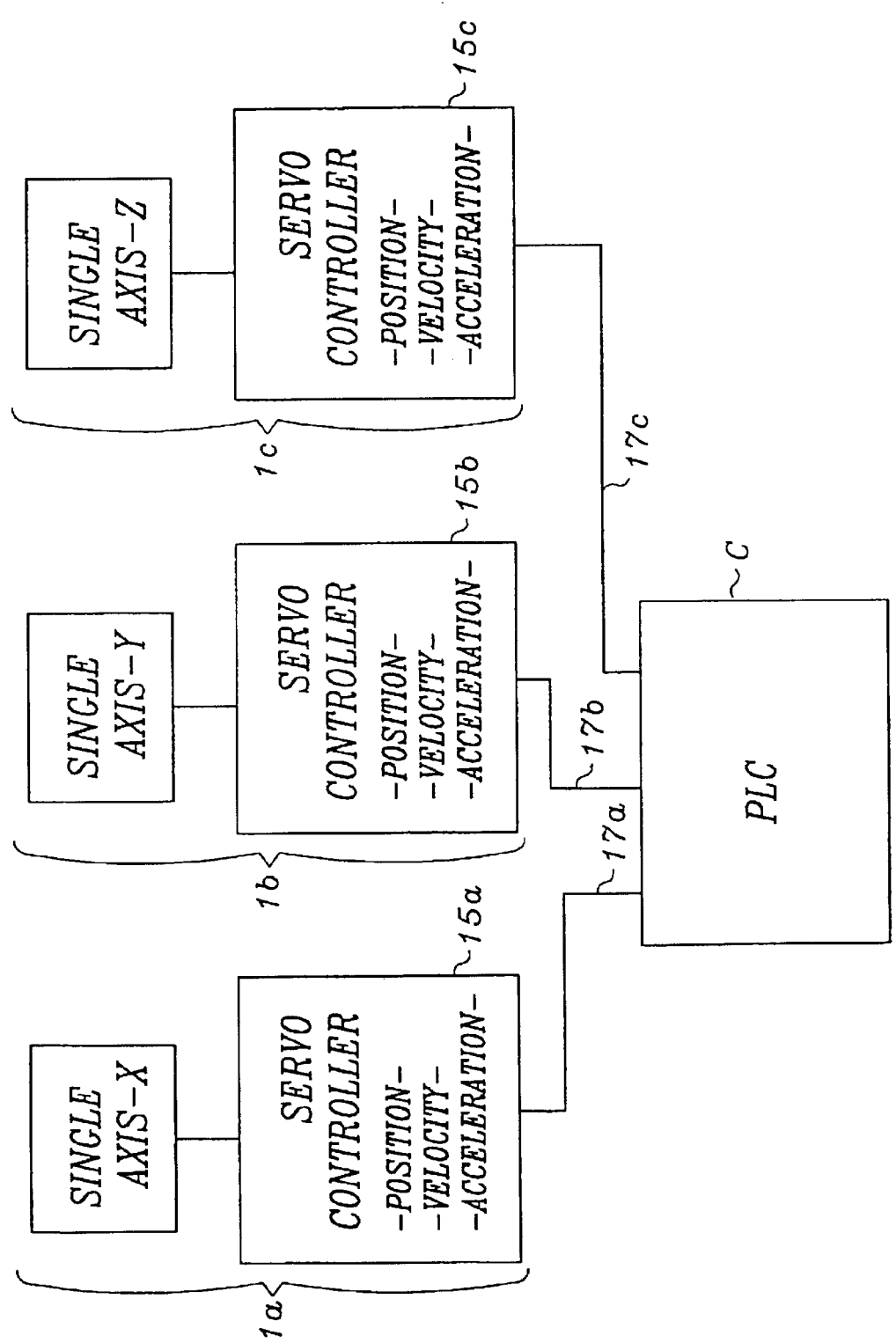
FIG. 13 is a schematic of a three-directional robotic module connected to a single remote computer.

Turning to FIG. 13 the control cables 17a–c from the actuators 1a–c place the actuator controllers 15a–c in communication with the computer C. Instructions from the remote computer C are sent to the dedicated controllers 15a–c to move the respective positioning rod 13a–c along their respective slide rails 7a–c. In this configuration, the remote computer C can position the plate 61 of the unit 60, and any object attached to the plate 61, in a desired location in a three-dimensional Cartesian space, by directing each of the modules M2, M3 and M4 to move their respective positioning rods 13a–c to a desired position. The distance the plate 61 can translate in any given direction is only limited by the length of travel available from the module that provides that direction of travel in the unit 60.

Figure 11:
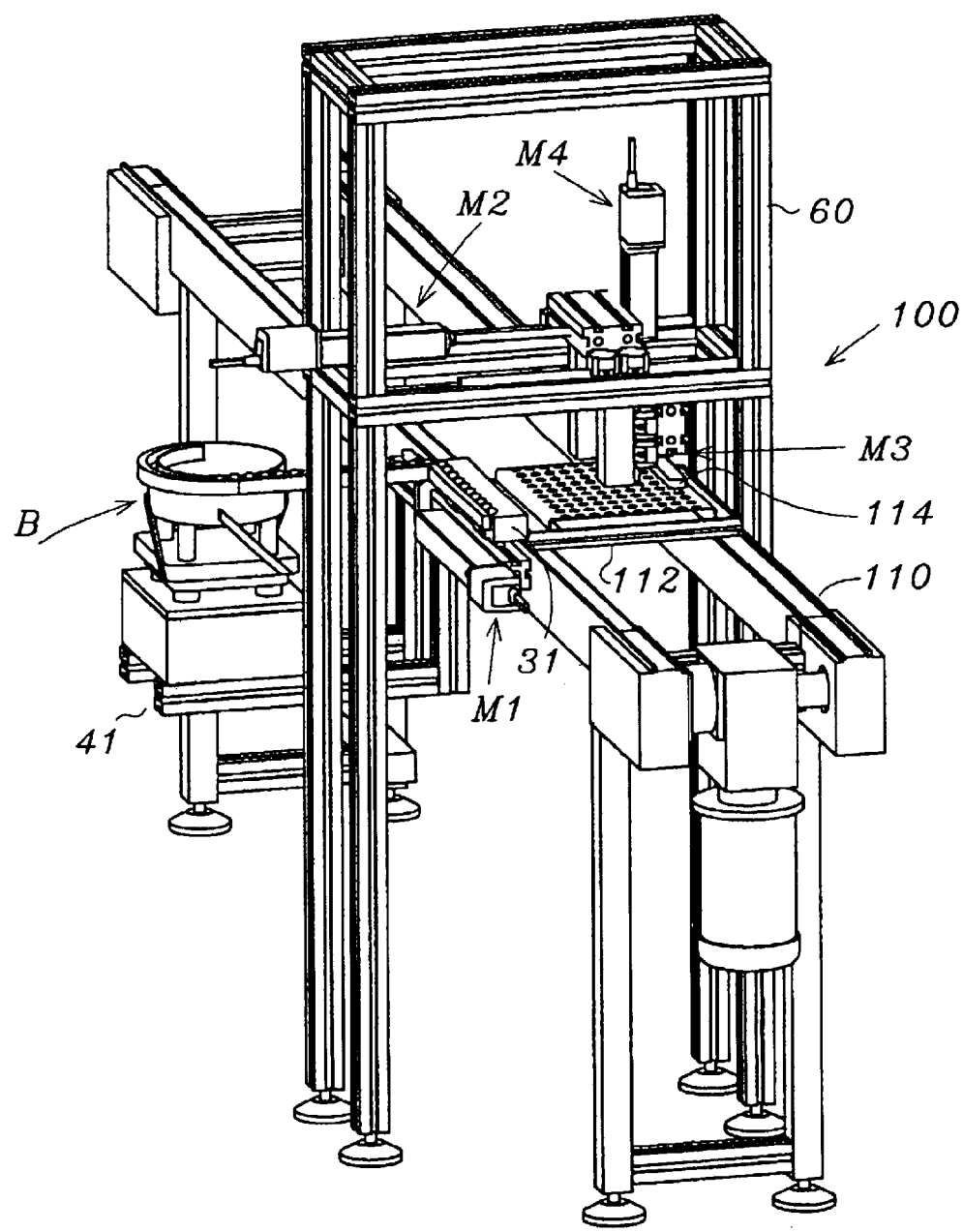
FIG. 11 is a perspective view of an assembly apparatus employing the single axis modular unit having a bowl feeder and the three axis modular unit.

The units 30 (FIGS. 5–8) and 60 (FIGS. 9–10) are modular units. Because the units are all constructed using the extruded members 3, the units can be assembled together. A robotic assembly system or unit 100 is shown in FIG. 11 which includes the units 30 and 60. The units 30 and 60 are positioned about a conveyer system 110. In the unit 100, a tray 112 moves along the conveyor to be positioned beneath the assembly 60. The unit 30 is used to load product P onto the rake 31. The unit 60 then moves a collector or gripper 114 which picks up the product P from the rake 31, (see also FIG. 12 and then deposits the product P in openings in the tray 112. Once full, the tray 112 is moved out from under the unit 60 by operation of the conveyor system 110. As can be appreciated, the computer C moves the rake 31 of unit 30 so that it can be properly filled with parts. The computer C then operates the unit 60 to raise, lower, and mover the gripper 114 to pick up the product P from the rake 31 and then transport and deposit the product P on the tray 114.

Figure 12:
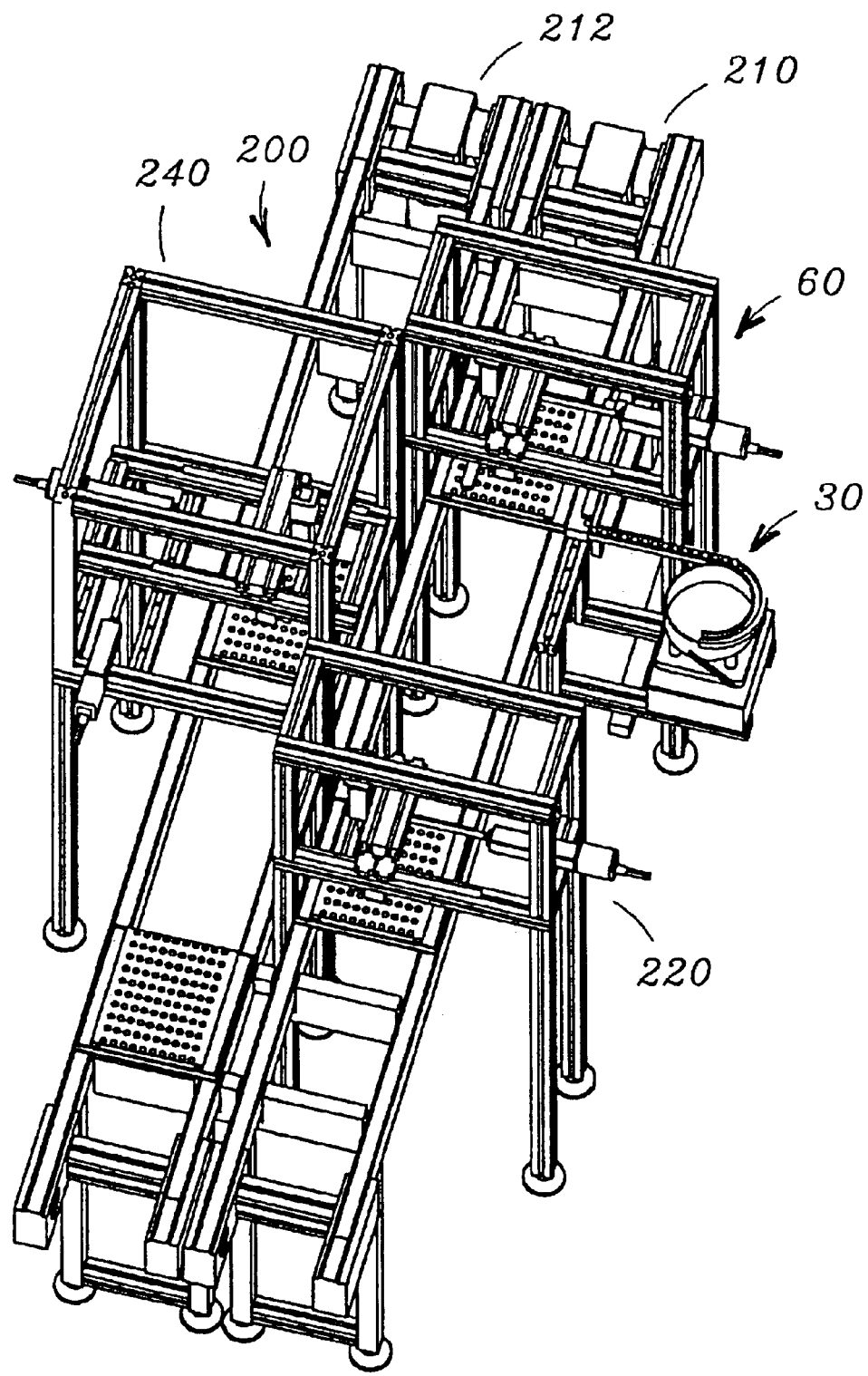
FIG. 12 is a perspective view of another assembly apparatus employing multiple robotic modular units.

In FIG. 12, a system or unit 200 is shown which includes several sub units, including the units 30 and 60, a pair of adjacent conveyors 210 and 212, and additional modules or units 220 and 240 (both of which are three-axis modules). The units 100 and 200 demonstrate how, using standard extrusions and interconnected linear actuators, separate units can be constructed, connected together, and integrated with each other to develop a production line in which product P is transported according to a predetermined pattern. Because the units are all made from the same parts, special pieces and special assembly techniques are not required. Hence, the cost and time to develop and build a unit, such as the unit 100 or 200 can be reduced.

As various changes could be made in the above constructions without departing from the scope of the invention, it is intended that all matter contained in the above description or shown in the accompanying drawings shall be interpreted as illustrative and not in a limiting sense. For example, although modules are shown which move parts in a single axis or in three-axes are shown, it will be understood that a module can be produced using the extrusions and actuators to move a part in two axes. Additionally, the members from which the modules are made are all connected together at right angles. The members could also be connected together an acute or obtuse angles (as opposed to right angles), to move a part along a diagonal path. These examples are merely illustrative.

What is claimed is:

1. The modular robotic system comprising a parts processor for assembling, testing, and/or packaging of at least one part comprising;

a modular system including one or more modular units, each modular unit comprising:

at least one structural member;

at least one actuator mounted to said at least one modular unit, said actuator having a body and a rod which is extendable and retractable relative to said body;

a controller dedicated to and connecting with said actuator to control the extension and retraction of said actuator rod, to be moved to multiple precise stops with programmed acceleration and velocity, the actuator being a servo-controlled actuator, said actuator including said dedicated controller, and said controller including a dedicated controller and a control system in communication with said dedicated controller, said dedicated controller activating said servo-actuator to extend and retract said actuator rod of said actuator in response to signals received from said control system;

said structural member including a plurality of faces, a groove in at least one of said faces, said groove is generally T-shaped, said groove including a base portion and a narrower neck portion extending from said base portion to said face, and a hole extending at least partially through said structural member;

at least one slide rail mounted on each said structural member; said slide rail being shaped to partially mount within said structural member groove;

a slide, said slide having a lower groove provided within its lower surface to accommodate the upper segment of the slide rail for a sliding engagement therein, said slide matingly slidably along said slide rail, the actuator rod being operatively connected to said slide to move said slide along said slide rail; and whereby any part during processing moved along with said slide by operation of said actuator and its rod for further processing of a part.

2. The modular robotic system of claim 1 wherein said structural member is an extruded part, and fastening members holding said slide rail to said structural member.

3. The modular robotic system of claim 1 wherein said machine part is a rake, a tray, or a gripper.

4. The modular robotic system of claim 1 and including a series of modular units formed into the system, one modular unit including a first actuator and its rod, a second modular unit including a second actuator and its rod, the rod of the first actuator moving in a first lineal axis, and the rod of the second actuator moving in a second lineal axis perpendicular to said first axis, said second modular unit being operatively connected to said first actuator and its rod to be moved along said first axis, and said second actuator and its rod moving said parts in the direction of the second lineal axis, whereby controlled movement by said first and second actuator rods by their respective dedicated controllers moves said at least one part in at least two axes.

5. The modular robotic system of claim 1 wherein a series of modular units are formed into the system, the first modular unit including a first actuator and rod, a second modular unit including a second actuator and rod, and a third modular unit including a third actuator and rod, said second modular unit operatively mounted to said first modular unit, said second modular unit being operatively mounted upon said first modular unit slide, said third modular unit operatively mounted to said second modular unit, the third modular unit being operatively mounted upon the slide of said second modular unit, the rod of the first actuator of the first modular unit moving in a first axis, the actuator and the rod of the second modular unit moving in a second axis perpendicular to said first axis, said first and second axes of movement of the rods defining a first plane, and the rod of the third actuator of the third modular unit moving in a third axis in a plane off set from said first plane, said second modular unit operatively connected to said first actuator rod to be moved in said first axis, said third modular unit operatively connected to said second actuator rod to be moved in said second axis, and said machine part being operatively connected upon the said of said third modular unit and its third actuator rod, whereby controlled movement of said first, second and third actuator rods respectively by said dedicated controllers moves said machine part in at least three axes.

6. The modular robotic system of claim 5 wherein said machine part is connected to said third actuator rod, and the machine part slides perpendicular in a feed direction for the parts being processed by the third modular unit.

7. The modular robotic system of claim 3 wherein said rake incorporating a plurality of pockets, each pocket shaped to receive a part to be processed, said rake indexed forwardly until each pocket is disposed a predetermined distance to receive a part, and said third modular unit moving said rake forwardly to dispose each part for further processing.

8. A modular robotic system of claim 3 wherein said parts are picked up and placed by said gripper for further processing by the system.

9. The modular robotic system of claim 1 including said modular unit being embodied within an open case, and said open case being formed of additional structural members.

10. The modular robotic system of claim 1 wherein there are a pair of said structural members in each modular unit, each pair of structural members being arranged parallel, and an end member connecting between each pair of structural members to secure the structural members together, there being one of said slide rail mounted on each said structural member, and said slide matingly slidable along each slide rails, said actuator mounted to an end member, and providing for its rod to move said slides during parts processing.

11. The modular robotic of claim 10 wherein there are a pair of modular units in the robotic modular system, each of the modular units having an actuator and its rod connected thereto, a second modular unit mounting onto the first modular unit provided for being indexed by the operations of the first actuator.

12. The modular robotic system of claim 11 and including a plate connecting onto the slides of the first modular unit, the plate expanding between and connecting to said slides of said first modular unit, said second modular unit mounted onto said plate for linear movement by the actuator rod of said actuator of the first modular unit.

13. The modular robotic system of claim 12 including said second modular unit having a pair of spaced apart parallel structures, end members provided at each end of the pair of structural members to secure the structural members together, there being a slide rail mounted upon each of the pair of structural members provided in the second modular unit, an actuator mounted onto one of said end members, its rod connecting to the second modular unit slides, to provide for their movement in a different linear direction.

* * * * *

UNITED STATES PATENT AND TRADEMARK OFFICE
CERTIFICATE OF CORRECTION

PATENT NO. : 6,899,511 B2
DATED : May 31, 2005
INVENTOR(S) : Leon Gurevich and Emanuil Grigg It is certified that error appears in the above-identified patent and that said Letters Patent is hereby corrected as shown below:

Column 11,
Line 47, the first "said" should read, -- slide --.

Column 12,
Line 28, after "robotic", should read, -- system --.

Signed and Sealed this

Sixteenth Day of August, 2005

JON W. DUDAS
*Director of the United States Patent and Trademark Office*